US009862127B2

(12) United States Patent
Bronnum et al.

(10) Patent No.: US 9,862,127 B2
(45) Date of Patent: Jan. 9, 2018

(54) METHOD FOR PRODUCING AN INSULATED PIPE IN CORRUGATED CASING

(71) Applicant: LOGSTOR A/S, Logstor (DK)

(72) Inventors: Thomas Bronnum, Fredericia (DK); Martin Pedersen, Veslos (DK)

(73) Assignee: LOGSTOR A/S, Logstor (DK)

( * ) Notice: Subject to any disclaimer, the term of this patent is extended or adjusted under 35 U.S.C. 154(b) by 359 days.

(21) Appl. No.: 14/766,625

(22) PCT Filed: Feb. 7, 2014

(86) PCT No.: PCT/EP2014/052462
§ 371 (c)(1),
(2) Date: Aug. 7, 2015

(87) PCT Pub. No.: WO2014/122278
PCT Pub. Date: Aug. 14, 2014

(65) Prior Publication Data
US 2015/0375433 A1    Dec. 31, 2015

(30) Foreign Application Priority Data
Feb. 8, 2013   (EP) .................................... 13154612

(51) Int. Cl.
*B29C 44/32*    (2006.01)
*B29C 47/02*    (2006.01)
(Continued)

(52) U.S. Cl.
CPC ........ *B29C 44/324* (2013.01); *B29C 47/0023* (2013.01); *B29C 47/0059* (2013.01);
(Continued)

(58) Field of Classification Search
CPC .... B29C 44/324; B29C 47/021; B29C 53/086
See application file for complete search history.

(56) References Cited

U.S. PATENT DOCUMENTS 3,594,246 A    7/1971    Arovelius
8,210,212 B2   7/2012    Buchner
(Continued)

FOREIGN PATENT DOCUMENTS

EP    0897788 A1    2/1999
GB    1221152       2/1971
(Continued)

OTHER PUBLICATIONS

International Search Report an Written Opinion PCT/EP2014/052462, dated Apr. 17, 2014.
(Continued)

*Primary Examiner* — Ryan Ochylski
(74) *Attorney, Agent, or Firm* — Brinks Gilson & Lione (57) ABSTRACT

A method for producing an insulated pipe in corrugated casing (100) comprising the steps of: covering an inner pipe assembly (105) comprising at least one inner pipe (101) with a film (106); dispensing an expandable insulation material (102) in a liquid state between the inner pipe assembly (105) and the film (106) thereby preparing an initial pipe assembly (107) comprising a layer of expanding insulation material (102a) positioned between the film (106) and the inner pipe assembly (105); extruding a layer of outer casing (104) onto the initial pipe assembly (105) before the insulation material has expanded completely, thereby creating a still expanding insulated pipe assembly (118); and leading the still expanding insulated pipe assembly (118) through a corrugator (205) having an inner corrugated surface giving the casing (104) a corrugated shape as the at least one layer of expanding insulation material (118) continues to expand.

18 Claims, 4 Drawing Sheets

(51) Int. Cl.
- B29C 47/12 (2006.01)
- F16L 59/153 (2006.01)
- B29C 47/00 (2006.01)
- F16L 59/14 (2006.01)
- B32B 1/08 (2006.01)
- B32B 5/18 (2006.01)
- B32B 15/18 (2006.01)
- B32B 27/32 (2006.01)
- B32B 3/28 (2006.01)
- B32B 15/04 (2006.01)
- B32B 15/08 (2006.01)
- B32B 15/20 (2006.01)
- B32B 27/06 (2006.01)
- B32B 27/30 (2006.01)
- B32B 27/34 (2006.01)
- B29C 53/08 (2006.01)
- B32B 27/08 (2006.01)
- B29K 101/10 (2006.01)
- B29K 105/04 (2006.01)

(52) U.S. Cl.
CPC .......... *B29C 47/021* (2013.01); *B29C 47/126* (2013.01); *B29C 53/086* (2013.01); *B32B 1/08* (2013.01); *B32B 3/28* (2013.01); *B32B 5/18* (2013.01); *B32B 15/046* (2013.01); *B32B 15/08* (2013.01); *B32B 15/18* (2013.01); *B32B 15/20* (2013.01); *B32B 27/065* (2013.01); *B32B 27/08* (2013.01); *B32B 27/304* (2013.01); *B32B 27/306* (2013.01); *B32B 27/32* (2013.01); *B32B 27/34* (2013.01); *F16L 59/143* (2013.01); *F16L 59/153* (2013.01); *B29C 47/0033* (2013.01); *B29K 2101/10* (2013.01); *B29K 2105/04* (2013.01); *B29K 2995/0067* (2013.01); *B32B 2266/0214* (2013.01); *B32B 2266/0271* (2013.01); *B32B 2266/0278* (2013.01); *B32B 2266/0285* (2013.01); *B32B 2305/022* (2013.01); *B32B 2307/304* (2013.01); *B32B 2597/00* (2013.01)

(56) References Cited

U.S. PATENT DOCUMENTS

2006/0032588 A1 2/2006 Appleby et al.
2010/0170590 A1* 7/2010 Juuti ................. B29C 47/0016
138/121

FOREIGN PATENT DOCUMENTS

| GB | 2046865 A | 11/1980 |
| WO | 8605570 A1 | 9/1986 |
| WO | 0039497 A1 | 7/2000 |
| WO | 2008142211 A1 | 11/2008 |

OTHER PUBLICATIONS

International Preliminary Report on Patentability for PCT/EP2014/052462, completed Mar. 6, 2015.

* cited by examiner

METHOD FOR PRODUCING AN INSULATED PIPE IN CORRUGATED CASING

RELATED APPLICATIONS

This application claims the benefit under 35 U.S.C. §371 of International Patent Application No. PCT/EP2014/052462, having an international filing date of Feb. 7, 2014, which claims priority to European Application No. 13154612.9, filed Feb. 8, 2013, the contents of both of which are incorporated herein by reference in their entirety.

The invention relates to an improved manufacture method of flexible perinsulated pipes by mean of a continuons process.

BACKGROUND

For district heating and for industry insulation, pre-insulated pipes are widely used. The pre-insulated pipes are in industry also known as insulated pipes, pre-insulated pipes, pipe in pipe, pre-insulated bonded pipes, and pipe assembly. In contrast to straight pre-insulated pipes, flexible pre-insulated pipes can be coiled and supplied in significant lengths.

Pre-insulated pipes may also be used for transporting of liquids or gas in other industries, e.g. the oil/gas industry.

A flexible pre-insulated pipe typically comprises one or more inner pipes of either metal or plastic covered by an insulation layer such as a polyurethane foam layer which is again surrounded by a casing pipe typically made of plastic. Flexible pre-insulated pipes that are continuously manufactured may further comprise a diffusion barrier in the form of e.g. a film or foil arranged between the insulation layer and the casing material.

A way of manufacturing flexible pre-insulated pipes is by using a discontinuous method. Firstly, a long corrugated plastic casing is extruded. Secondly, one or more inner pipes are fed into the corrugated casing. Finally, a device dispensing a polyurethane mixture is drawn through the assembly thereby filling the gap between the inner pipe(s) and the corrugated casing with insulation material. One disadvantage with using this method is that the length of the produced pipe is limited by the length of the productions line. Typically the length of flexible pre-insulated pipes produced by the discontinuous method is up to 100 m. This means, that if a longer flexible pre-insulated pipe is needed, multiple pipes needs to be assemble e.g. by use of a coupler, which can be a cumbersome process.

Another widespread method of manufacturing flexible pre-insulated pipes is a continuous process which proceeds as follows: Liquid polyurethane foam mixture is poured on an endless sheet, such as plastic film or foil, arranged on the bottom of O-shaped moulds. One or more inner pipes arranged in conjunction are together with the sheet moved forward into the moulds with a certain velocity. The liquid polyurethane foam mixture expands and gradually fills the gap between the sheet and the inner pipe(s), the latter fed continuously into the moulds at a velocity corresponding to the velocity of the sheet. After full expansion of the liquid polyurethane foam mixture, the foam cures inside the moulds and subsequently, the insulated inner pipes exit the moulds and enter a station where a plastic casing can be extruded onto the insulation material (the now cured polyurethane foam).

In this way a flexible pre-insulated pipe assembly is obtained having an insulating layer and casing with a constant cross section in longitudinal direction. Although both the inner pipe(s) and insulating layer have a certain degree of flexibility, the pipe assembly does not exhibit a profound flexibility as it is difficult to produce sharp corrugation edges as the casing does not easily fill into the corrugation recesses. Also, a long production line is needed with this production method, which is in turn takes up a large amount of space.

U.S. Pat. No. 8,210,212, GB1221152 and EP897788 all disclose examples of a production method where the insulation layer in an insulated pipe is corrugated prior to applying an outer casing. In GB1221152 the production method comprises dipping a liquid expanding insulation material onto a paper strip surrounding the inner pipe in such a manner that the insulation material will be positioned between the inner pipe and the paper strip. Around the paper strip, a metal strip is bent into a tube welded together longitudinally before it is fed into a corrugator. As the insulation material expands, it obtains a shape mimicking the shape of the corrugated metal strip. After the pipe has obtained its corrugated shape, it is covered with a sheath of plastic material extruded onto the pipe. The corrosion-resistant plastic material serving as the outer casing is applied after the corrugated shape has been obtained.

DESCRIPTION OF THE INVENTION

Disclosed herein is a method for producing an insulated pipe in corrugated casing. The method comprises the steps of:
a) covering an inner pipe assembly comprising at least one inner pipe with a film;
b) dispensing an expandable insulation material in a liquid state between the inner pipe assembly and the film thereby preparing an initial pipe assembly comprising a layer of expanding insulation material positioned between the film and the inner pipe assembly;
c) extruding a layer of outer casing onto the initial pipe assembly before the insulation material has expanded completely, thereby creating a still expanding insulated pipe assembly; and
d) leading the still expanding insulated pipe assembly through a corrugator having an inner corrugated surface giving the casing a corrugated shape as the at least one layer of expanding insulation material continues to expand thereby producing the insulated pipe in corrugated casing.

The layer of the expandable insulation material in a fully expanded state has an inner diameter $d_{inner}$, and an outer diameter $d_{outer}$ varying between a minimum outer diameter $d_{outer,\ min}$ and a maximum outer diameter $d_{outer,\ max}$, the variation in outer diameter being defined by the corrugated shape of the casing.

By using the method described above, a very flexible pipe in corrugated casing can be obtained in a continuous manner. The pipe obtain is further not limited in regards to the length of the produced insulated pipe. Also, the production setup is compressed in the sense that it does not require a large production area.

When using an expandable insulation material, the insulation material can advantageously be thermosetting foams such as e.g. polyurethane (PUR) foam, polyisocyanurate (PIR) foam, polyimide (PI) foam or similar polyisocyanate based foams or other thermosettings foams such as e.g. epoxy foam or phenolic foam.

In one or more embodiments the inner pipe assembly further comprises one or more inner layers of insulating material and wherein the method further comprising the step of covering the at least one inner pipe by the one or more inner layers of insulating material prior to performing step a). This is advantageous as it is thereby possible to utilize different aspects of different types of insulation material and in combination obtain an even further improved pipe.

In one or more embodiments the one or more inner layers of insulating material have different material properties in regards to e.g. flexibility, insulation property and/or temperature stability compared to the expandable insulation material.

In one or more embodiments the one or more inner layers of insulating material is chosen from the group of aerogels, aerogel composites, fibre reinforced aerogels, mineral wool or flexible polyimide (PI) foam.

The inner insulation material(s) may e.g. be a very high quality and expensive material, which one would normally not use as the only insulation material since it would increase the prize of the pipe too much.

The inner insulation material could also be a medium or high resistance material specifically suitable for use in pipes for transporting low temperature substances such as liquefied natural gas (LNG) or high temperature substances such as super-heated steam. Often, the medium or high resistance material specifically suitable in relation to transporting low/high temperature substances a lower quality product in regards to the insulation property compared to e.g. conventional foams normally used as insulation material, why they would never be used as the only insulation material. By combining two different insulation materials, the advantageous associated with each of the insulation material types can be utilized in the same pipe.

In one or more embodiments the one or more inner layers of insulating material comprises two, three, four, five, six, seven, eight, nine or ten individual inner layers of insulating material.

In one or more embodiments at least two of the individual inner layers of insulating material have different material properties in regards to e.g. flexibility, insulation property and/or temperature stability compared to the expandable insulation material.

In one or more embodiments the one or more inner layers of insulating material comprises a first inner layer of insulation material, and a second inner layer of insulation material positioned between the first inner layer of insulation material and the expandable insulation material, wherein the first insulation material have a higher temperature stability than the second inner layer of insulation material.

In one or more embodiments the difference between the inner diameter $d_{inner}$ of the fully expanded state of the layer of expandable insulation material and the minimum outer diameter $d_{outer,\ min}$ of the fully expanded state of the layer of expandable insulation material is smaller than the difference between the minimum outer diameter $d_{outer,\ min}$ of the fully expanded state of the layer of expandable insulation material and the maximum outer diameter $d_{outer,\ max}$ of the fully expanded state of the layer of expandable insulation material.

In one or more embodiments the thermal conductivity of the one or more inner layers of insulating material is significantly lower than the thermal conductivity of the expandable insulation material.

In one or more embodiments the film comprises one or more of the materials: polyethylene (PE); ethylene vinyl alcohol (EVOH); polyamide (PA); or polyvinylidene chloride (PVDC). Choosing these materials gives the film diffusion barrier properties, which protects against diffusion of gases such as nitrogen, oxygen, carbon dioxide and others. This is in particular the case when using EVOH or PVDC.

In one or more embodiments the method further comprises the step of sucking the casing against the inner corrugated surface of the corrugator by use of vacuum as the still expanding insulated pipe is led through the corrugator. The vacuum is normally applied to mould blocks in the corrugator via tiny channels. Using vacuum enables creation of an insulated pipe in a corrugated casing with a well-defined shape. This shape can be designed to improve the flexibility and bendability of the pipe significantly. Using vacuum further ensures that the exact same corrugation shape of the pipe is obtained each time.

In one or more embodiments the casing is a plastic casing e.g. made from one or more of the materials: polyethylene (PE); polypropylene (PP); polybutylene (PB); or co-polymer such as e.g. acrylonitrile butadiene styrene (ABS).

In one or more embodiments the casing comprises a set of sub-layers extruded by use of co-extrusion with one of the sub-layers being a diffusion barrier material and the outer-most layer being a casing layer. One of these sub-layers can be a diffusion barrier material sub-layer, which protects against diffusion of gases such as nitrogen, oxygen, carbon dioxide and others. The outer-most sub-layer will normally be a casing layer.

The diffusion barrier material sub-layer can alternatively on both sides be surrounded by a casing sub-layer with the different layers being attached to one another by use of adhesive layers.

In one or more embodiments the diffusion barrier material sub-layer comprises one or more of the materials: ethylene vinyl alcohol (EVOH); polyamide (PA); or polyvinylidene chloride (PVDC), which are all known to have excellent diffusion barrier properties in regards to protection against diffusion of gases such as nitrogen, oxygen, carbon dioxide and others. In particular, EVOH and PVDC have shown to be particularly suitable for this purpose.

In one or more embodiments the at least one inner pipe is made of a polymeric material such as e.g. cross-linked polyethylene (PEX), metal such as e.g. copper (Cu) or steel, or a combination of the two materials in the form of e.g. PEX-aluminium-PEX (Alupex).

BRIEF DESCRIPTION OF THE DRAWINGS

FIG. 6a is a cut-through view along the longitudinal direction of a third pipe produced by the production method and FIG. 6b is a cut-through view in the transverse direction of the same pipe as displayed in FIG. 6a.

DESCRIPTION OF PREFERRED EMBODIMENTS

Throughout this section, different types of insulation materials are mentioned including a first type of insulation material referred to as 102 and a second type of insulation material referred to as 103. For each of the two material types, the numeral 'a' denotes a state were the insulation material is in an expanding/expandable state and numeral 'b' denotes a state were the material is expanded. Numeral 'c' is used in connection with the second type of insulation material 103 to denote a state where the material is compressible.

The production method described herein proceed in a number of step wherein the first steps are designed to prepare an initial pipe assembly 107 comprising an inner pipe assembly 105, a film 106 and a layer of expanding insulation material 102a positioned between the film 106 and the inner pipe assembly 105. The inner pipe assembly comprising at least one inner pipe 101.

Figure 1:
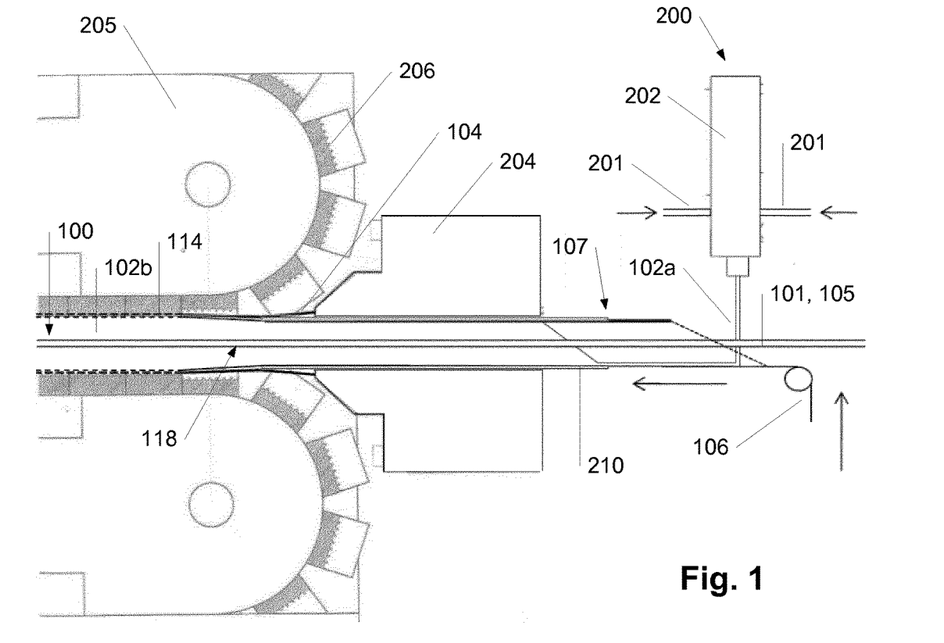
FIG. 1 shows part of the production line used in connection with an embodiment of the method for producing an insulated pipe in corrugated casing.
Figure 2:
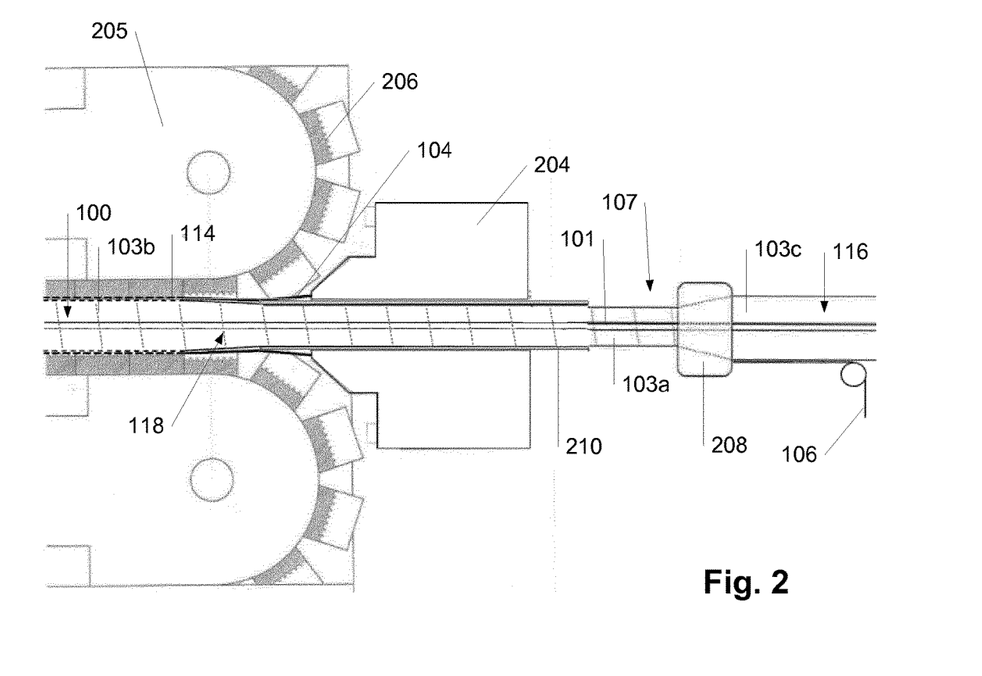
FIG. 2 shows part of the production line used in connection with an alternative embodiment of the method for producing an insulated pipe in corrugated casing.

Obtaining the initial pipe assembly 107 can be accomplished in different ways as e.g. shown in FIGS. 1 and 2, respectively.

FIG. 1 shows part of the production line used in connection with a first embodiment of the method for producing an insulated pipe in corrugated casing 100. In this embodiment of the method, the initial pipe assembly 107 with the expandable insulation material 102a is produced by first covering the inner pipe assembly 105 with a film 106 and afterwards dispensing an expandable insulation material 102a in a liquid state in between the inner pipe assembly 105 and the film 106.

A mixing head 200 is used for dispensing the insulation material 102a. The mixing head 200 shown FIG. 1 comprises a number of streams 201 each providing the mixing chamber 202 with the different liquid raw material which is mixed to give the liquid expandable insulation material 102a.

The insulation material 102 suitable for use with this method is preferably a thermosetting foam such as e.g. polyurethane (PUR) foam, polyisocyanurate (PIR) foam, polyimide (PI) foam or similar polyisocyanate-based foams or other thermosetting foams such as epoxy foam or phenolic foam.

The thermosetting foam can be designed to expand fast or be designed to expand slowly.

FIG. 2 shows part of the production line used in connection with an alternative method for producing an insulated pipe in corrugated casing 100. In this embodiment of the method, the initial pipe assembly 107 with the expandable insulation material is produced by first covering an inner pipe assembly 105 comprising at least one inner pipe 101 with at least one layer of compressible insulation material 103c and afterwards surrounding the at least one layer of compressible insulation material 103c with a film 106 thereby creating a compressible inner pipe assembly 116.

To create the inner pipe assembly 107 with the expandable insulation material, the compressible inner pipe assembly 116 is compressed by directing it through an opening having a smaller circumference than the circumference of the compressible inner pipe assembly 116. In this way, an inner pipe assembly 107 is created which will expand as the compressed insulation material 103a is decompressing. The opening is in FIG. 2 shown as a pipe 208, e.g. a short metallic pipe but could also be a funnel with an inner circumference which decreases in the direction which the compressible inner pipe assembly 116 is lead.

As an alternative to the above method shown in FIG. 2 the inner pipe assembly 107 could also be created by first covering an inner pipe assembly 105 comprising at least one inner pipe 101 with at least one layer of compressible insulation material and then secondly surrounding the at least one layer of compressible insulation material with a film in such a manner that the compressible insulation material is compressed. The film could e.g. be wrapped around the pipe assembly tightly.

Compressible insulation materials 103 suitable for use in this method are materials such as aerogels, aerogel composites (e.g. fibre reinforced aerogels), mineral wool or flexible polyimide (PI) foam.

After the initial pipe assembly 107 has been obtained by either of the methods described above, the assembly 107 is led continuously into a casing extruder 204 through a short inlet pipe 210 comprised in the casing extruder 204. The short inlet pipe 210 can e.g. be a metallic pipe, and is normally fixed in position on both sides of and in the casing extruder 204 cross head.

When the initial pipe assembly 107 exits the inlet pipe 210, the casing extruder 204 continuously extrudes a layer of outer casing 104 onto the initial pipe assembly 107. The layer of outer casing 104 is extruded onto the initial pipe assembly 107 before the expanding insulation material 102a, 103a has expanded completely, whereby a still expanding insulated pipe assembly 118 is obtained. By the term 'expanded' is also included decompressed.

Before the expanding insulation material 102a, 103a is fully expanded, the still expanding insulated pipe assembly 118 is fed into a corrugator 205 having mould blocks 206 giving the corrugator 205 an inner corrugated surface, which is facing the casing layer 104. The casing 104 is pressed against the inner corrugated surface of the corrugator 205 thereby obtaining a corrugated shape as the at least one layer of expanding insulation material 102a, 103a continues to expand. Thereby the insulated pipe in corrugated casing 100 is produced.

The inner corrugated surface of the corrugator 205 can be designed for optimum flexibility of the resulting corrugated casing 114 after it has been formed into the corrugated shape.

Figure 3:
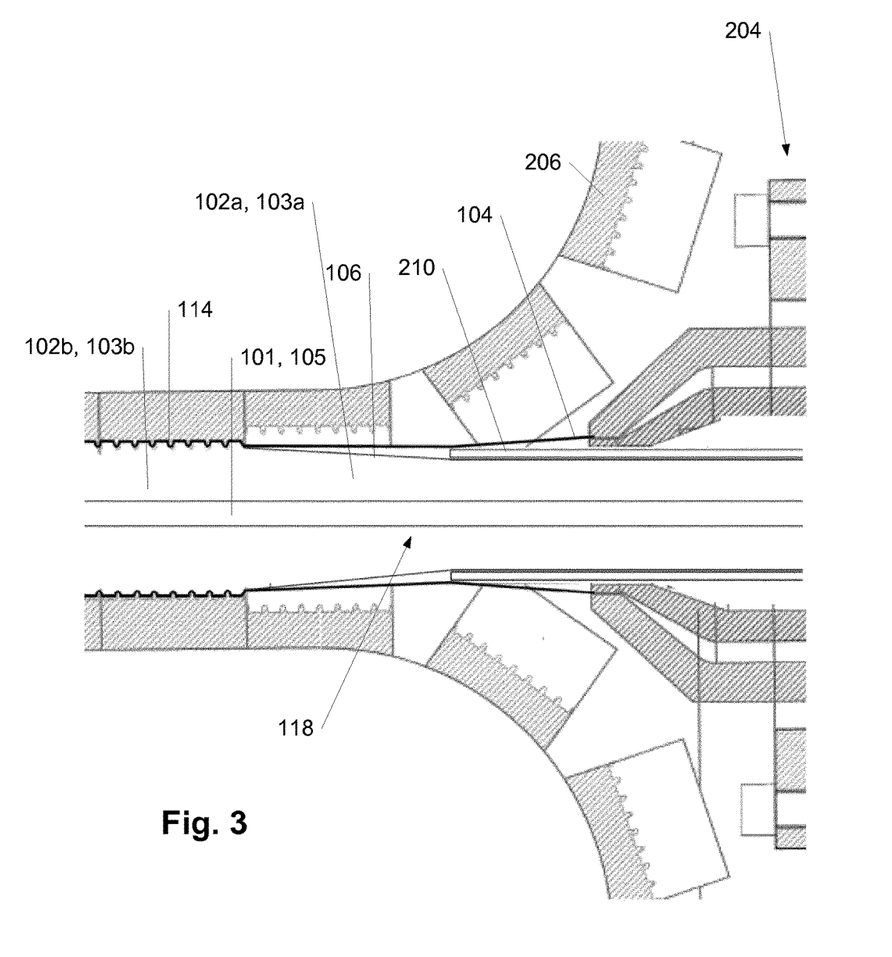
FIG. 3 is a close up of a part of the production line which the embodiments of FIGS. 1 and 2 have in common.

The individual mould blocks 206 can be continuously moved around on conveyer type belts surrounding the still expanding insulated pipe assembly 118 which moves at a speed matching that of the conveyer belt. This part of the production line is shown in FIG. 3, which is a close-up of a part of the production line being the same in both FIGS. 1 and 2.

The expanding insulating material 102a, 103a is still expanding as it exits the inlet pipe 210 in the casing extruder 204 and continues to do so at least until it enters the position inside the corrugator 205 where the moulds have closed completely.

In order to obtain an exact corrugation shape of the outer casing 114, the casing 104 may be sucked against the inner corrugated mould black surface of the corrugator 205 by use of vacuum as the still expanding insulated pipe 118 is led through the corrugator 205. The vacuum is applied to the mould blocks 206 when the moulds blocks 206 have closed completely in the corrugator 205 via tiny channels in the mould blocks 206.

Using vacuum ensures that the exact same shape of the pipe is obtained each time.

Alternatively, the pressure from the expanding insulation material 102a can press the casing 104 against the mould block 206 surface inside the corrugator 205, thereby also obtaining an exact corrugation shape.

In case of using the production step involving compressible insulation material 103c as the starting material, compressed gas or air fed into the initial pipe line assembly can also be used to press the expanding insulation material 103a, the film 106 and the casing 104 into the corrugated shape inside the corrugator 205.

The casing 104 may be a plastic casing e.g. made from one or more of the materials: polyethylene (PE); polypropylene (PP); polybutylene (PB); or co-polymer such as e.g. acrylonitrile butadiene styrene (ABS).

Figure 5:
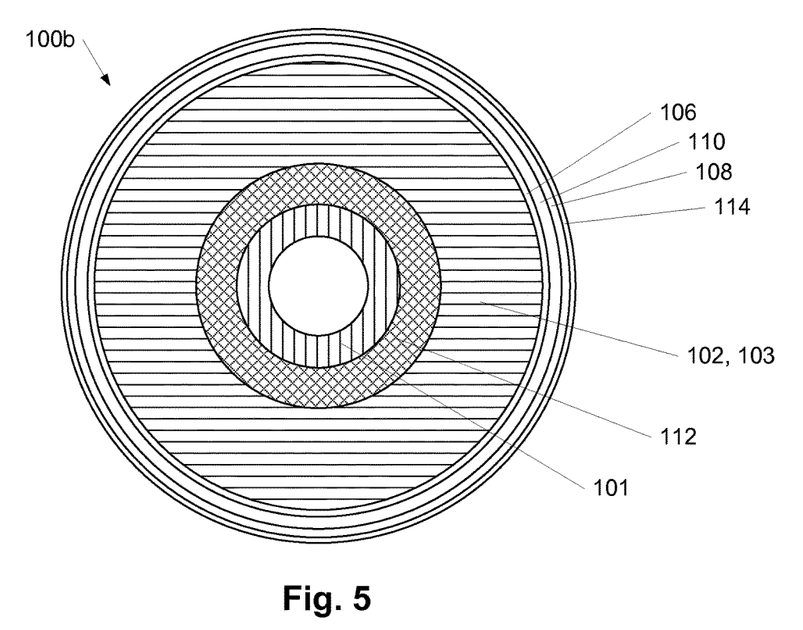
FIG. 5 is a cut-through view of a second pipe produced by the production method.

Also, the casing 104 may comprise a set of sub-layers extruded by use of co-extrusion. The outer-most layer will normally be a casing layer 104, whereas one of these sub-layers can be a layer of a diffusion barrier material 110. An example of this kind of outer casing is illustrated in FIG. 5.

Alternatively, the diffusion barrier material sub-layer 110 can on both sides be surrounded by a casing sub-layer with the different layers being attached to one another by use of adhesive layers 108.

If the casing 104 comprises a diffusion barrier material sub-layer 110, this layer may comprise one or more of the materials: ethylene vinyl alcohol (EVOH); polyamide (PA); or polyvinylidene chloride (PVDC). The diffusion barrier layer 110 reduces diffusion of gases such as nitrogen, oxygen, carbon dioxide and others. The advantage of this is that there will be less reduction of the insulation performance of the insulation material over time, when the insulation material is a thermosetting foam with cell-gases having lower thermal conductivity than air.

The film 106, which is softened by the heat of the extruded casing 104, is pressed towards the casing 104 as the expanding insulation material 102a, 103a continues to expand. Hereby the film 106 adheres or is welded onto the hot casing material 104. At the same time the expanding insulation material 102a, 103a completely fills the gap between the inner pipes 101 and the casing 104, 114, adding to the ease with which a very flexible pre-insulated pipe in corrugated casing 100 can be produced.

The film 106 may comprise one or more of the materials: polyethylene (PE); ethylene vinyl alcohol (EVOH); polyamide (PA); or polyvinylidene chloride (PVDC). When the film 106 includes in particular EVOH and/or PVDC, it has a diffusion barrier effect against diffusion of gases such as nitrogen, oxygen, carbon dioxide and others.

The film 106 can further be treated to adhere to the insulation material 102, 103. The advantage of this is that the pipe assembly is fully bonded from the inner pipe 101 to the outer corrugated casing 114, whereby it is ensured that load transfer between all layers in the pipe assembly is accomplished. Thus all loads leading to tensile stress, compressive stress and/or shear stress can be transferred between all the layers in the pipe.

After leaving the corrugator 205, the insulated pipe in corrugated casing 100 is cooled down and finally coiled in desired lengths.

The at least one inner pipe 101 can be made of a polymeric material such as e.g. cross-linked polyethylene (PEX), a metal such as e.g. copper (Cu) or steel, or a combination of the two materials in the form of e.g. PEX-aluminium-PEX (Alupex).

The inner pipe(s) 101 may be a media inner pipe and/or a pre-corrugated inner pipe. Two or more inner pipes 101 can be simultaneously positioned inside the insulation material 102, 103 in the pipe 100.

Figures 6A, 6B:
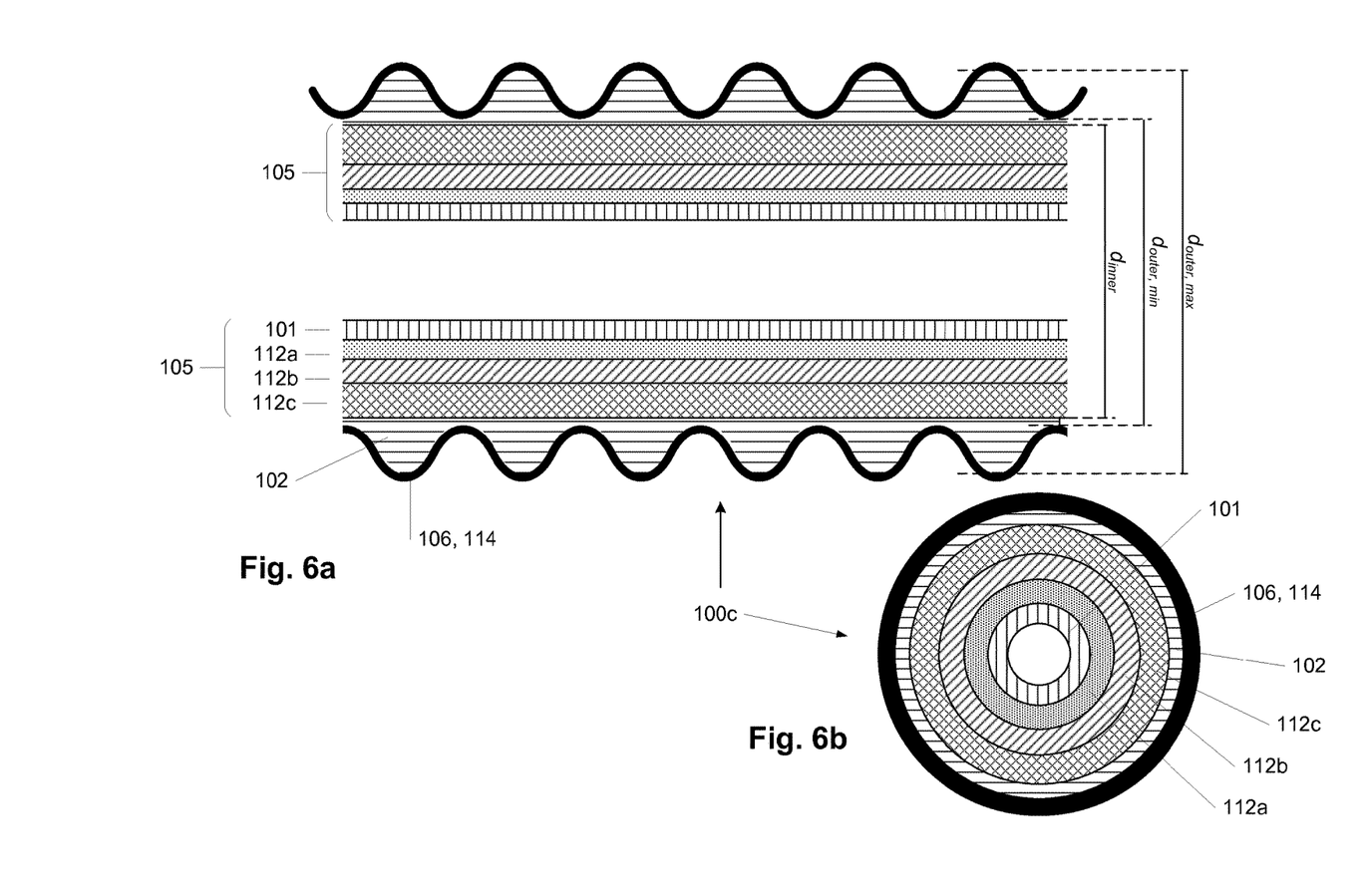

An inner pipe with a pre-applied additional inner insulating layer 112 can be used as the starting inner pipe as shown in FIGS. 5 and 6a-b. The inner insulation layer 112 will normally be applied in a separate method step prior to the initial pipe assembly 105 being covered with the layer of insulation material 102, 103.

The initial pipe assembly 105 may comprises one or more inner layers of insulating material 112. The production method therefore may also comprise the step of covering the at least one inner pipe 101 by the one or more inner layers of insulating material 112 prior to covering the inner pipe assembly 105 with the film 106.

The inner insulating layer(s) 112 and the insulation layer 102, 103 may have quite different material properties in regards to e.g. flexibility, insulation property and/or temperature stability. This is advantageous as it is thereby possible to utilize different aspects associated with the different types of insulation material and in combination obtain an improved pipe.

The one or more inner layers of insulating material 112 may be chosen from the group of aerogels, aerogel composites, fibre reinforced aerogels, mineral wool or flexible polyimide (PI) foam.

The additional insulation material(s) 112 may e.g. be a very high quality and expensive material, which one would not use as the only insulation material due to it increasing the prize of the pipe to a too high level.

The additional insulation material(s) 112 could also be a medium or high resistance material specifically suitable for use in pipes for transporting low temperature substances such as liquefied natural gas (LNG), or high temperature substances such as super-heated steam. The medium or high resistance material suitable for use in re to transport of low/high temperature substances could be a low quality product in regards to the insulation property compared to e.g. conventional foams normally used as insulation material. By combining two different insulation materials, the most prominent properties each directed at different aspects can be provided in the same pipe.

It may also be possible to have an additional film positioned between the different insulation material layers. This film could possibly be a metal foil or similar having diffusion barrier properties.

More than one additional layer of insulation material could also be applied to the inner pipe 101 prior to applying the first mentioned insulation material 102, 103.

The one or more inner layers of insulating material may e.g. comprise two, three, four, five, six, seven, eight, nine or ten individual inner layers of insulating material.

At least two of the individual inner layers 112 of insulating material may have different material properties in regards to e.g. flexibility, insulation property and/or temperature stability compared to the expandable insulation material.

For example, the one or more inner layers 112 of insulating material may comprise a first inner layer of insulation material 112a, and a second inner layer of insulation material 112b positioned between the first inner layer of insulation material 112a and the expandable insulation material 102, wherein the first insulation material 112a may have a higher temperature stability than the second inner layer of insulation material 112b.

The difference between the inner diameter $d_{inner}$ of the fully expanded state of the layer of expandable insulation material 102b and the minimum outer diameter $d_{outer,\ min}$ of the fully expanded state of the layer of expandable insulation material 102b is smaller than the difference between the minimum outer diameter $d_{outer,\ min}$ of the fully expanded state of the layer of expandable insulation material 102b and the maximum outer diameter $d_{outer,\,max}$ of the fully expanded state of the layer of expandable insulation material 102b.

The thermal conductivity of the one or more inner layers of insulating material 112 mm may be significantly lower than the thermal conductivity of the expandable insulation material insulation 102.

Figure 4:
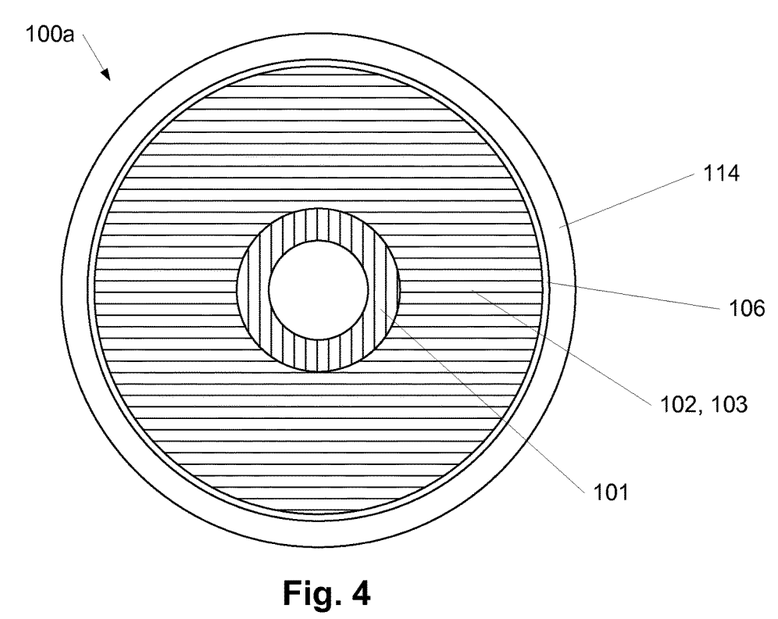
FIG. 4 is a cut-through view of a first pipe produced by the production method.

FIGS. 4 and 5 show cut-through views of a first example of a pipe in corrugated casing 100a and a second example of a pipe in corrugated casing 100b, respectively, produced by the production method. The pipe 100b shown in FIG. 5 differs from that shown in FIG. 4 in that it includes a three-layer casing and an additional layer of insulation material 112.

FIGS. 6a-b show a third example of a pipe in corrugated casing 100c shown along two cut-through directions in FIGS. 6a and 6b. The pipe 100c comprises an inner pipe assembly 105 with an inner pipe and three layers of inner insulation material 112a, 112b, 112c. As can be seen in FIG. 6a, the liquid insulation layer 102 varies in thickness reflecting the differences between the maximum inner diameter and the minimum inner diameter.

In an example, four inner insulation layers 112a, 112b, 112c, 112d may be cryogel layers which have significantly better insulation properties than the outer most foam insulation layer of 102. This means that the overall thermal conductivity (lambda value, $\lambda$) for the entire pipe may be as low as approximately $\lambda$=17 mW/m K (milli watt per meter per Kelvin), which is much closer to the value of the inner insulation layers 112a, 112b, 112c of typically $\lambda$=16 mW/m K than to that of the outer most insulation foam layer 102 of $\lambda$=22 W/m K. The thickness of each of the inner layers will normally be around 10 mm and the thickness of the foam insulation layer 102 at the maximum outer diameter will typically be 20 mm, whereas the thinnest thickness will be around 2 mm.

The inner insulation layer 112a may also by an aerogel based blanket with a high temperature sustainability, which may be able to sustain temperatures up to more than 600° C. or an aerogel based blanket with a low temperature sustainability, which may only be able to sustain cryogenic temperatures. By choosing the different insolation layers according to requirements of the pipe, e.g. where the pipe is going to be used and what material it is going to transport, the optimum condition in terms of insulation property, possible temperature of the material to be transported and production cost can be obtained individually for each pipe still using the production method described above.

Different combinations in regards to number of casing layers and/or the amount of insulation layers as shown in FIGS. 4, 5 and 6a-b can also be imagined.

REFERENCES 100 insulated pipe in corrugated casing
100a first example of an insulated pipe in corrugated casing
100b second example of an insulated pipe in corrugated casing
101 inner pipe
102 first type of insulation material
102a expanding insulation material of the first type
102b expanded insulation material of the first type
103 second type of insulation material
103a expanding insulation material of the second type
103b expanded insulation material of the second type
103c compressible insulation material of the second type
104 casing
105 inner pipe assembly
106 film
107 initial pipe assembly
108 adhesive material
110 diffusion barrier
112 additional inner insulation material
112a first layer of inner insulation material
112b second layer of inner insulation material
112c third layer of inner insulation material
114 corrugated casing
116 compressible inner pipe assembly
118 still expanding insulated pipe assembly
200 mixing head for dispensing liquid insulation material
201 streams for liquid raw materials
202 mixing chamber
204 casing extruder
205 corrugator
206 corrugator mould piece
208 pipe piece/funnel
210 inlet pipe in the casing extruder

The invention claimed is:

1. A method for producing an insulated pipe in corrugated casing comprising the steps of:
    a) covering an inner pipe assembly comprising at least one inner pipe with a film;
    b) dispensing an expandable insulation material in a liquid state between the inner pipe assembly and the film thereby preparing an initial pipe assembly comprising a layer of expanding insulation material positioned between the film and the inner pipe assembly;
    c) extruding a layer of outer casing onto the initial pipe assembly before the insulation material has expanded completely, thereby creating a still expanding insulated pipe assembly; and
    d) leading the still expanding insulated pipe assembly through a corrugator having an inner corrugated surface giving the casing a corrugated shape as the at least one layer of expanding insulation material continues to expand thereby producing the insulated pipe in corrugated casing, wherein the layer of the expandable insulation material in a fully expanded state has an inner diameter $d_{inner}$, and an outer diameter $d_{outer}$ varying between a minimum outer diameter $d_{outer,min}$ and a maximum outer diameter $d_{outer,max}$, the variation in outer diameter being defined by the corrugated shape of the casing.

2. A method according to claim 1, wherein the expandable insulation material is a thermosetting foam.

3. A method according to claim 1, wherein the inner.

4. A method according to claim 3, wherein the one or more inner layers of insulating material have different material properties.

5. A method according to claim 4, wherein the one or more inner layers of insulating material is chosen from the group of aerogels, aerogel composites, fibre reinforced aerogels, mineral wool or flexible polyimide (PI) foam.

6. A method according to any one of claim 3, wherein the one or more inner layers of insulating material comprises two, three, four, five, six, seven, eight, nine or ten individual inner layers of insulating material.

7. A method according to claim 6, wherein at least two of the individual inner layers of insulating material have different material properties.

8. A method according to claim 3, wherein the one or more inner layers of insulating material comprises
    a first inner layer of insulation material, and
    a second inner layer of insulation material positioned between the first inner layer of insulation material and the expandable insulation material, wherein the first insulation material have a higher temperature stability than the second inner layer of insulation material.

9. A method according to claim 3, wherein the thermal conductivity of the one or more inner layers of insulating material is significantly lower than the thermal conductivity of the expandable insulation material.

10. A method according to claim 1, wherein the difference between the inner diameter $d_{inner}$ of the fully expanded state of the layer of expandable insulation material and the minimum outer diameter $d_{outer,min}$ of the fully expanded state of the layer of expandable insulation material is smaller than the difference between the minimum outer diameter $d_{ourer,min}$ of the fully expanded state of the layer of expandable insulation material and the maximum outer diameter $d_{outer,max}$ of the fully expanded state of the layer of expandable insulation material.

11. A method according to claim 1, wherein the film comprises one or more of the materials:
polyethylene (PE);
ethylene vinyl alcohol (EVOH);
polyamide (PA); or
polyvinylidene chloride (PVDC).

12. A method according to claim 1, further comprising the step of sucking the casing against the inner corrugated surface of the corrugator by use of vacuum as the still expanding insulated pipe is led through the corrugator.

13. A method according to claim 1, wherein the casing is a plastic casing.

14. A method according to claim 1, wherein the casing comprises a set of sub-layers extruded by use of co-extrusion with one of the sub-layers being a diffusion barrier material and the outer-most layer being a casing layer.

15. A method according to claim 14, wherein the diffusion barrier material sub-layer comprises one or more of the materials:
ethylene vinyl alcohol (EVOH);
polyamide (PA); or
polyvinylidene chloride (PVDC).

16. A method according to claim 1, wherein the at least one inner pipe is made of a polymeric material, metal, or a combination of the two materials. initial pipe assembly continuously into a casing extruder through a short inlet pipe comprised in the casing extruder between steps b) and c).

17. A method according to claim 1 further comprising the step of leading the initial pipe assembly continuously into a casing extruder through a short inlet pipe comprised in the casing extruder between steps b) and c).

18. A method according to claim 17, wherein the expandable insulation material is a thermosetting foam.

* * * * *

UNITED STATES PATENT AND TRADEMARK OFFICE
CERTIFICATE OF CORRECTION

PATENT NO. : 9,862,127 B2
APPLICATION NO. : 14/766625
DATED : January 9, 2018
INVENTOR(S) : Thomas Bronnum et al.

It is certified that error appears in the above-identified patent and that said Letters Patent is hereby corrected as shown below:

In the Claims

In Column 10, Claim 6, Line 55, after "A method according to" replace "any one ofclaim 3," with --claim 3,--.

Signed and Sealed this
Twenty-eighth Day of May, 2019

Andrei Iancu
*Director of the United States Patent and Trademark Office*